United States Patent [19]

Miller

[11] 4,421,198

[45] Dec. 20, 1983

[54] VARIABLE FREQUENCY VACUUM ACTUATED SEISMIC ENERGY SOURCE

[76] Inventor: Norvel L. Miller, 11713 Possum Hollow La., Houston, Tex. 77009

[21] Appl. No.: 325,386

[22] Filed: Nov. 27, 1981

Related U.S. Application Data

[63] Continuation-in-part of Ser. No. 183,800, Sep. 4, 1980, abandoned.

[51] Int. Cl.³ .............................................. G01V 1/147
[52] U.S. Cl. ................................... 181/121; 181/114; 181/401
[58] Field of Search ............... 181/401, 400, 402, 114, 181/113, 121, 119; 137/625.47, 625.22; 74/33, 422; 428/373

[56] References Cited

U.S. PATENT DOCUMENTS

| | | | |
|---|---|---|---|
| 2,859,628 | 11/1958 | Arko | 74/33 |
| 2,868,176 | 1/1959 | Bennett | 137/625.22 |
| 3,189,121 | 6/1965 | Vander Stoep | 181/119 |
| 3,349,867 | 10/1967 | Mounce | 181/119 |
| 3,361,226 | 1/1968 | Szasz | 181/401 X |
| 3,363,720 | 1/1968 | Mifsud et al. | 181/401 |
| 3,535,874 | 12/1968 | Smith | 137/625.47 |
| 3,900,677 | 8/1975 | Barber | 428/373 |
| 3,927,693 | 12/1975 | Johnston | 137/625.47 |
| 3,980,039 | 9/1976 | Henning | 74/422 X |
| 4,114,722 | 9/1978 | Weber et al. | 181/114 |
| 4,116,300 | 9/1978 | Stone | 181/113 |

Primary Examiner—Maynard R. Wilbur
Assistant Examiner—K. R. Kaiser
Attorney, Agent, or Firm—Dula, Shields & Egbert

[57] ABSTRACT

A variable frequency seismic pulse is produced by releasing a weighted piston within a partially evacuated cylinder. The piston compresses residual air in the cylinder before striking a base plate held firmly in contact with the ground. Controlling the pressure of the gas remaining in the cylinder controls the frequency and amplitude of the seismic pulse applied to the ground. The seismic pulse can be applied at various angles from vertical from a thumper mounted on a vehicle or from a hand-held thumper.

11 Claims, 15 Drawing Figures

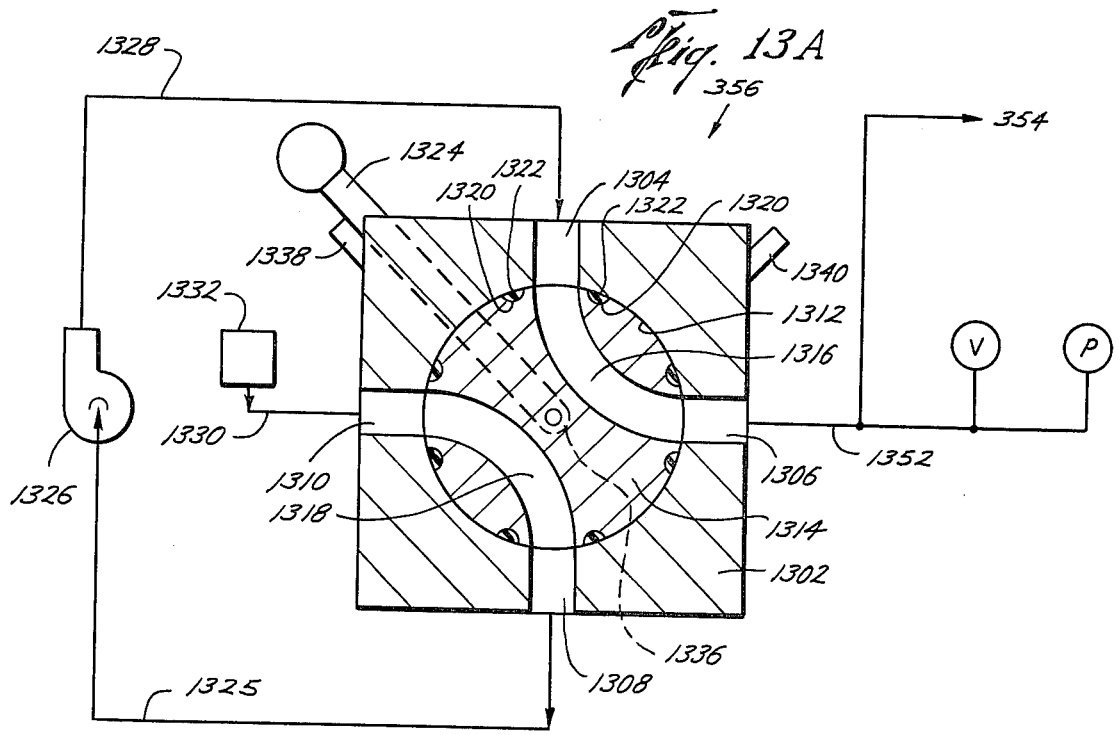
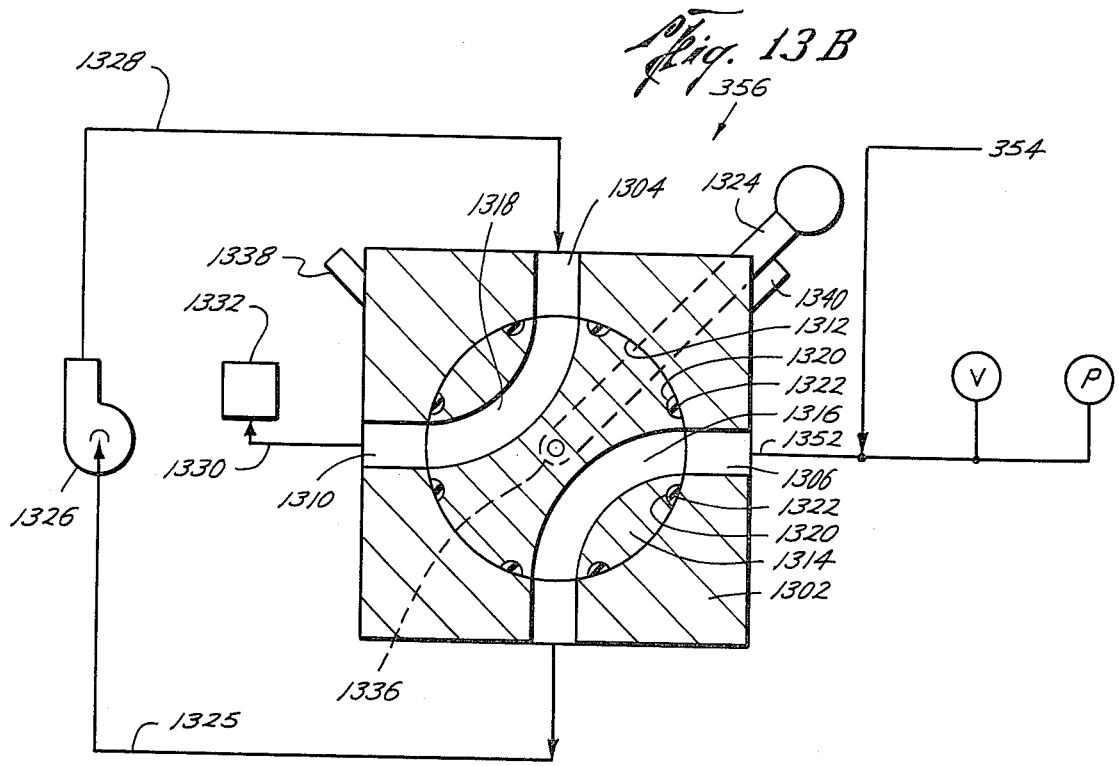

VARIABLE FREQUENCY VACUUM ACTUATED SEISMIC ENERGY SOURCE

RELATED APPLICATION

This application is a continuation-in-part of Application Ser. No. 183,800, filed on Sept. 4, 1980, now abandoned.

TECHNICAL FIELD

The present invention is directed generally to a non-explosive seismic wave source and more particularly to a variable frequency seismic source producing downward directed waves having a high signal to noise ratio by means of a piston in a partially evacuated cylinder impacting a base plate in contact with the earth, said piston being impelled by air pressure and gravity.

BACKGROUND ART

Vehicle mounted seismic sources, i.e. thumpers or vibrators, have long been known to those skilled in the art of seismic exploration. Examples include U.S. Pat. Nos. 3,288,244; 3,642,090; and 3,951,229. Vibrators are characterized by low energy output, but their frequency, which is usually quite low, can be controlled. Thumpers are more powerful, but produce a great deal of recoil and produce only a fixed, usually rather high, fundamental frequency. All of these devices are themselves extremely heavy and require heavy vehicles to carry and pre-bias them against the ground. This restricts their use in the field to readily accessible areas. Further, prior art devices generate a great deal of noise in addition to the seismic wave that produces returns of geological interest.

The prior art has taught the use of vacuum to lift heavy pressure plates used in conventional seismic sources. An example of this is shown in U.S. Pat. No. 3,983,947. The use of a partial vacuum to energize a seismic pulse generator for waterborne operation has been taught by the prior art. Examples include U.S. Pat. No. 3,349,867 and Canadian Pat. No. 608,169. Such devices cannot be used practically on land because they operate effectively only when coupled to the earth through water and a flexible diaphragm. They are also too weak to be widely useful. Nothing known to the applicant in the prior art teaches or suggests the use of a variable partial vacuum to tune the fundamental frequency of the seismic pulse. The large recoil characteristic of prior art seismic impulse generators requires that must be held to the ground by the weight of a large, heavy vehicle.

The closest prior art to the present invention is that taught by U.S. Pat. No. 3,189,121, issued to Van der Stoep on June 15, 1965.

Stoep teaches a seismic generator comprising a vacuum reservoir in external communication with a tube fitted with a movable piston. A base plate, not coupled to the tube, has a projection that enters the tube. This projection is covered by a fluid. The movable piston is propelled by atmospheric pressure to strike the fluid which, in turn, moves the base plate. The base plate may either set directly on the ground or may strike the pressurized fluid that is in contact with the ground by a flexible diaphragm. Stoep requires the use of a "heavy truck" to hold the source in contact with the ground. This is necessary because Stoep produces a great deal of recoil. Stoep even suggests the desirability of adding weight to the truck to "insure that the seismic pulse generator remains in contact with the surface of the earth" (Col. 2, lines 49-54, Stoep).

Stoep uses a controlled partial vacuum in its tube 10 and its connected vacuum reservoir 32 to do two things:
(1) vary the total energy generated in each seismic pulse (Stoep, Col. 2, lines 19-22); and
(2) reduce the tendency of the free piston to vibrate (Stoep, Col. 2, lines 11-13).

It must be noted that the amplitude and frequency of a seismic pulse are not the same. They should not be confused.

Amptitude is the total energy injected into the formation. Frequency is the rate at which this transfer of energy occurs.

In the present invention this rate of energy transfer is controlled by compression of residual air between the piston and the sliding base plate plug. Stoep cannot teach compression of this type because any residual air in tube 10 of Stoep would escape freely through port 35 into Stoep's relatively large vacuum reservoir 32.

Because Stoep teaches use of a relatively large vacuum reservoir, it cannot teach or suggest frequency control. Total energy, which is the variable Stoep controls by changing the degree of the evacuation of the tube and reservoir, is a function of the terminal velocity of the piston. As contrasted with Stoep, the present invention's difference of structure (no vacuum reservoir) and function (compression of residual air) leads to a synergistic difference in result (seismic wave frequency tuning).

Unlike Stoep, the present invention will work even when it is set against the ground at the end of the long arm of a "cherrypicker" truck. The present invention uses no oil and thus it can be operated at an angle to the vertical. The present invention can frequency match to the formation being studied.

Finally, Stoep's use of a vacuum reservoir suggests that the research of those skilled in the art of seismic wave production was proceeding in a direction that would have precluded frequency control as is taught by the present invention.

DISCLOSURE OF THE INVENTION

In accordance with the preferred aspect of this invention, a cylinder capable of being partially or fully evacuated is sealed at one end by a movable piston secured by a releasing mechanism and at the other end by a pressure pad capable of being brought into contact with the earth. The top of the cylinder above the piston is vented to admit the atmosphere. The lower base plate is fitted into the lower end of the cylinder and is resiliently mounted to the side of the cylinder through fixed couplings. Pressure couplings, passageways and lines place the interior of the of the cylinder in fluid communication selectively with a source of greater or less than atmospheric pressure. The releasing mechanism is provided with a reporting means adapted to signal the presence of the piston at the top of the cylinder. The pressure line in fluid communication with the cylinder is provided with a pressure gauge calibrated to display pressure remaining in the cylinder in convenient units. The vacuum thumper can be used mounted on a vehicle or while held in the operator's hands. Rigid mounting means affix the entire apparatus to the back of a truck or other convenient vehicle for mobile use. When configured for mobile use, the present invention is equipped with hydraulic cylinders or other convenient means for pre-biasing the apparatus, i.e. holding its base plate firmly in contact with the ground, either vertically or at various angles from vertical.

The present invention also comprehends a method for using the apparatus. Within a range of frequencies determined by its physical characteristics, i.e. mass, size, etc., the present invention may be utilized to produce seismic waves over a range of fundamental frequencies. As air pressure in the cylinder is decreased, the frequency of the acoustic wave produced by the apparatus increases to the upper limit of this range of frequencies. Essentially, the method of the present invention comprises partially evacuating the cylinder to a pressure selected to produce a desired frequency and then releasing the piston. The force of gravity and air pressure on top of the piston causes it to strike the pressure plate, which generates a seismic wave.

The present invention provides a method and apparatus for creating seismic waves in the earth wherein the frequency and wave form of the seismic wave is tunable by controlling the air remaining in a partially evacuated cylinder.

A further purpose of the present invention is to provide a lightweight, safe vacuum energized seismic energy source that has extremely low recoil so it may be used in conjunction with a lightweight vehicle.

Another purpose of the present invention is to provide a lightweight, safe vacuum energized seismic energy source that has extremely low recoil so that it may be used while held in the operator's hands.

Yet a further purpose of the present invention is to provide an apparatus and method of generating a clean seismic energy pulse, i.e. one having a high signal to noise ratio.

Another purpose of the present invention is to provide a seismic energy pulse that can be applied at various angles from the vertical.

A final purpose of the present invention is to provide a seismic energy source that is cheap and easy to construct and requires little maintenance.

BRIEF DESCRIPTION OF THE DRAWINGS

FIG. 13A is a cross-sectional view, in partial schematic, of the pressure-suction valve of the present invention.

FIG. 13B is a view of the pressure-suction valve of FIG. 13A showing the passageways in an alternative position.

DESCRIPTION OF THE PREFERRED EMBODIMENT

Figure 1:
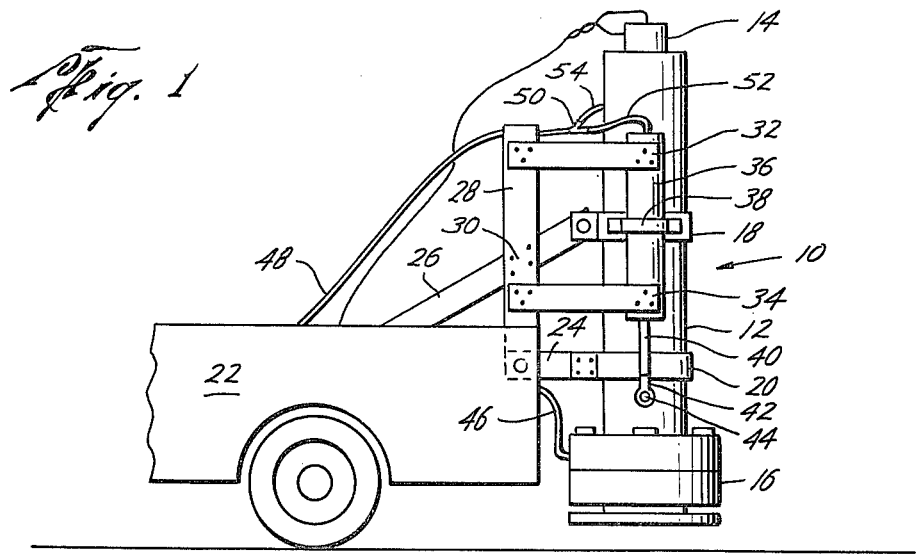
FIG. 1 is an elevational view of the overall apparatus of the present invention taken from one side of the supporting vehicle and illustrating the apparatus in its retracted, or traveling, mode.

In FIG. 1, apparatus 10 includes cylinder 12 having release mechanism 14 at its upper end and pressure pad assembly 16 at its lower end.

Cylinder 12 is held by guide bands 18 and 20 that annularly surround the cylinder allowing it to move only up and down. Collar 20 is connected to truck 22 rigidly by support arm 24. Collar 18 is connected rigidly to truck 22 by inclined support arm 26.

Vertical support arm 28 is affixed at its lower end rigidly to truck 22 and at intersection 30 to diagonal arm 26 by bolts, rivets, welds, or other convenient fastening means. Likewise, the upper end of arm 26 is connected to the forward end of restraining collar 18 by bolts, welds, rivets, or the like. Upper and lower transverse supports 32 and 34, respectively, rigidly attach hydraulic cylinder 36 to vertical support arm 28. Hydraulic cylinder 36 is also connected to upper guide collar 18 by strap 38. Piston 40 of hydraulic cylinder 36 is attached through turnbuckle 42 to structural support post 44, which is rigidly affixed by any convenient means to the lower portion of cylinder 12 below lower restraining collar 20. Hydraulic line 46 connects the interior of cylinder 12 to a source of vacuum or pressure, not shown, through valves or other controls, also not shown.

All the pneumatic and hydraulic controls described in connection with the present invention are well known to those skilled in the art and therefore will not be described in detail.

Hydraulic line 48 is connected through T-connector 50 to hydraulic line 52, which energizes hydraulic cylinder 36 and hydraulic line 54, which energizes a hydraulic cylinder identical to hydraulic cylinder 36 mounted 180-degrees around cylinder 12 from hydraulic cylinder 36.

The support frame restraining collar and positioning mechanism structurally described above may be made of any material adequate to bear the load placed on it when the cylinder is extended into its operational position plus the vibrational impulse loads associated with actuation of the seismic source taught by the present invention. These constructions are well known to those skilled in the art and need not be described in detail. It should be understood that this description of a preferred embodiment of the present invention is not limited to the specific structural details discussed above. Many different ways of bringing the apparatus taught by the present invention into contact with the earth would be obvious to those skilled in the art. For example, the apparatus could be hand-held against a formation and operated at any angle.

Functionally, the apparatus discussed above in connection with FIG. 1 teaches a simple lightweight means of attaching the apparatus taught by the present invention into a truck or half-track or other vehicle.

In the past, a major limitation to the use of portable seismic sources is that they were far too heavy to be conveniently transported into remote and inaccessible areas. Today, these remote and relatively inaccessible areas are the very places that must be geophysically explored to discover oil and other mineral resources. The prior art suffered from a weight problem for several fundamental reasons. First, most prior art devices are actuated by high pressure, hydraulic fluid, gravity alone, or explosives. The few vacuum actuated devices taught by the prior art are not very usable on land because they produce a weak signal and have to be coupled through a medium, such as water, to produce the best results. Hydraulic and explosive actuators require extremely thick and heavy casings to withstand the high pressure developed during their operation. Dropping weights requires an enormous mass to develop an acceptable signal. Thus, heretofore any source strong enough to be useful was too heavy to carry to remote locations. In fact, an entire transportation subspecialty has grown up in the art of geophysical exploration dealing with the off-road placement of these extremely heavy seismic wave sources.

Another reason the apparatus taught by the prior art had to be heavy was that its operation generated a great deal of recoil. If a high recoil device is not pressed very firmly to the ground, it will not effectively transfer seismic wave energy into the ground. Even worse, recoil in prior art devices manifests itself in the acoustic signal detected by geophones as a high level of noise. Pressing a prior art seismic generator firmly against the ground does not eliminate this noise, but merely injects it into the ground along with the seismic waveform that generates information of geophysical interest. The present invention must also be biased, i.e. preloaded with weight, but because the present invention's seismic pulse is much cleaner than that generated by the prior art and because residual air trapped in the cylinder alters the seismic energy pulse generated by the present invention resulting in better coupling between the invention and the ground, the present invention's preloading may be much less than is required by the prior art.

The present invention can be mounted on a ¾-ton truck or very light half-track. In its retracted position, as shown in FIG. 1, it can be taken anywhere an all-terrain vehicle can go. Because it is light and operates with very little recoil, the present invention can be used to geophysically explore areas never before accessible to nonexplosive seismic sources. Finally, because of its low recoil, truck 22 need not be a special purpose, heavy vehicle but can be a stock truck or the present invention may be hand-held.

Figure 2:
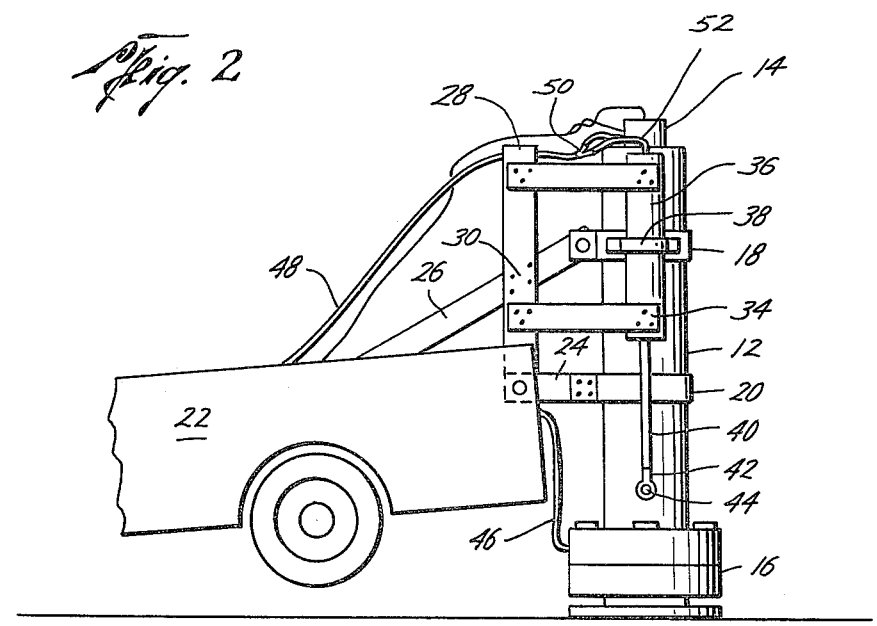
FIG. 2 is an elevational view of the present invention similar to FIG. 1 except that the apparatus is shown in its operating position.

FIG. 2 shows the preferred embodiment of the present invention described in connection with FIG. 1, above, in its operating position. Here, like numbers indicate like structures. Hydraulic fluid under pressure from a source, not shown, has been forced into cylinder 36 and its companion cylinder on the other side of the apparatus. The rear wheels of the truck 22 are shown in FIG. 2 as being lifted off the ground. This may or may not be necessary depending on the amount of load with which presure plate 16 must be biased onto the ground for optimum effectiveness of the present invention. This will depend on the type of ground and on the characteristics of the seismic waveform being injected into it.

Figure 3:
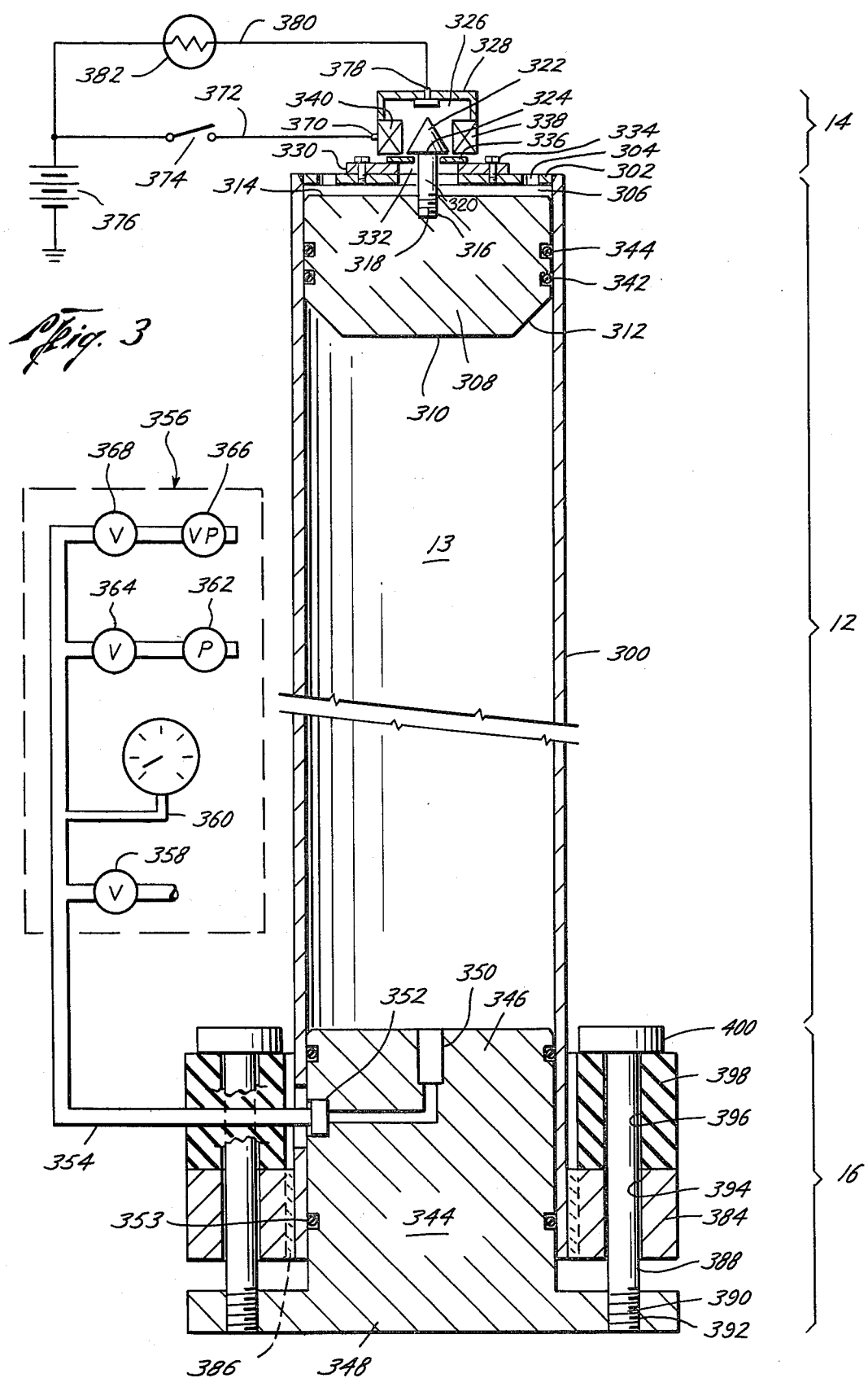
FIG. 3 is a detailed cross-sectional view of the apparatus taught by the preferred embodiment of the present invention. A schematic representation of the pressure and electrical systems utilized by the present invention are also shown.

FIG. 3 shows a cross-sectional view taken through release mechanism 14, cylinder 12 and base plate assembly 16 of the preferred embodiment of the present invention. Cylinder wall 300 has an upper plate 302 affixed at its upper end by welds or other means. Plate 302 is provided with a number of vent openings 304 which allow atmospheric pressure to enter the space 306 above piston 308.

Piston 308 has a front side 310 and an annular front shoulder 312. The middle of its top surface 314 is a threaded opening 316 which threadably engages the bottom threaded portion of release holding pin 318. The shank 320 of release holding pin 318 has a conical top section 322 which is capable of projecting through holding plate 324 of release mechanism 326. The broader portion of the cone of upper portion 322 is proximate the piston 308.

Release mechanism 326 includes an outer shell 328 whose lower end comprises a circumferential flange 330. Flange 330 secures release mechanism 326 centered over opening 332 and upper plate 302 by means of threaded bolts 334 and elastomeric seal 336.

Solenoids 338 and 340 are adapted to actuate holding plate 324 such that upper conical part 322 of holding shank 320 is held within the restraining mechanism when no power is applied to the solenoids. This release mechanism is well known to those skilled in this art. Although an electrical embodiment is shown here, the release mechanism may be hydraulic or mechanical. When power is applied to the solenoids the plates separate and conical portion 322 may move freely out of the release mechanism.

Piston 308 is equipped with first and second O-rings 342 and 343, respectively, which provide an annular hermetic seal about piston 308 with the wall 300 of cylinder 12.

Pressure pad 344 comprises upper cylindrical plug portion 346 which fits closely within the interior of the lower portion of cylinder 12 and a lower flat plate portion 348 which extends annularly beyond the plug portion. In the preferred embodiment of the present invention lower portion 348 is circular, but it may be square or of any other convenient shape. Plate 348 is made of 6061T6 aluminum, but may be made of any material structurally equivalent, for example, some types of wood or plastic. The upper portion of plug 346 is equipped with a pressure passageway 350 which is connected by external connector 352 to vacuum and pressure line 354 and, hence, to pneumatic pressure control system 356. This passageway and line places the interior of cylinder 12 in fluid communication with control system 356. Control system 356 includes valve 358, which controllably vents the interior of cylinder 12 to atmosphere; pressure gauge 360, which is in fluid communication with line 354; pressure source 362, which may be any convenient source of pressure, i.e. compressed gas, cylinders or mechanical compressors; and fluid communication through control valve 364 to line 354. Finally, vacuum source 366 is in fluid connection through control valve 368 with line 354 and hence the interior of cylinder 12. Vacuum source 366 is a vacuum pump in the preferred embodiment of the present invention.

FIG. 13A, which is presented here out of sequence because this is a continuation in part application, illustrates a novel form of pressure-suction valve that is part of the present invention.

Structually, Valve 356 is shown first in FIG. 13A, which is a cut away view of Valve 356. Valve 356 has an outer valve block, 1302, defining a pressure passageway 1304, a tube passageway 1306, a suction passageway 1308 and a vent passageway 1310.

All of these passageways are in fluid communication at their ends interior to Valve Block 1302 with a cylindrical cavity 1312, which contains a closely fitted valve core 1314.

Valve core 1314 is provided with a first passageway 1316, which is shown in FIG. 13A placing passageway 1304 in fluid communication through passageway 1316 to passageway 1306.

Valve core 1314 also defines a second interior passageway 1318 which is placed through core source 1314 so, as is shown in FIG. 13A, to place passageway 1310 in fluid communication with passageway 1308.

Valve core 1314 is also provided with a plurality of longitudinal channels 1320, at least one of which is on each end of passageways 1316 and 1318. Each longitudinal channel 1320 is equipped with a ceiling gasket 1322, by which a hermetic seal is maintained that isolates each end of channels 1316 and 1318 from the small annulus, not labeled, between the outer wall cylinder 1314 and the inner wall of Valve Block 1302.

The outer end of the passageway 1306 is in fluid communication with line 1352 which is described in detail in connection with FIG. 1.

The outer end of suction passageway 1308 is in fluid communication with suction line 1325. Suction passageway 1308 is in fluid communication with the suction side of pumping means 1326. Pumping means 1326 may be any pumping means capable of producing the changes in pressure required to mobilize the piston of the present invention. The pressure side of pump 1326 is in fluid communication with one end of pressure line 1328. The other end of pressure line 1328 is in fluid communication with pressure passageway 1304.

The outer end of vent passageway 1310 is in fluid communication with one end of vent line 1330, whose other end is in fluid communication with the atmosphere through a filter 1332.

An actuating handle lever 1324 is fastened at its lower end 1336 to the center axis of valve core 1314. Valve core 1314 is rotatably engaging cavity 1312 and block 1302 and lever arm 1324 is affixed at one end to its center of rotation and fully against stop 1338. A second stop 1340 is shown affixed at a point 90 degrees clockwise from stop 1338 on valve block 1302.

Functionally, valve 356 is a 4 way valve that allows pump 1326 to be permanently connected between suction entrance 1308 and pressure entrance 1304 of valve block 1302. Likewise, vent 1330 is permanently connected to valve block vent port 1310. Tube line 354 is permanently in fluid communication with tube port 1306.

The valve block and core may be made of any suitable material, many of which are well known to the art of those engaging in fluid engineering. One example would be brass, with rubber or teflon longitudinal seal strips.

When lever 1324 is pressed hard against stop 1338, vent 1330 is placed in fluid communication with the section side of pump 1346 through valve passageway 1318 of valve core 1314 and pressure line 1328 from pump 1326 is placed is fluid communication through passageway 1316 with tube line 354. The fluid pressure resulting from the operation of pump 1326 is thus placed into line 354, with the results that are described elsewhere, i.e. the piston in the present invention is raised.

FIG. 13B illustrates the mode of operation of valve 1356 as it is used to evacuate the tube of the present invention.

In FIG. 13B the figures indicate the same structures in 13A, the only difference is that operator lever 1324 has been pulled 90 degrees clockwise against stop 1340, whereby passageway 1318 now connects vent 1330 in fluid communication with pressure side 1328 of pump 1326. Likewise, suction side 1325 of pump 1326 is now in fluid communication through passageway 1316 with tube line 354. When pump 1326 is operated, it draws suction from the tube of the present invention through line 354 and passes its pressurized exhaust through the vent line 1330 of valve 356.

The result of using the valve illustrated in FIGS. 13A and 13B is that a single valve is capable of controlling the operation of the present invention with a single movement. In operational embodiments of the present invention, lever 1324 is adapted to be moved by a hydraulic cylinder, not shown, which is remotely controlled from a front panel in a well known way.

Solenoids 338 and 340 of release mechanism 326 are connected through connector 370 and electrical line 372 to single pole, single momentary contact switch 374 which is in turn connected to one side of battery 376. The other side of battery 376 is connected to ground. Momentary contact pushbutton switch 378 is connected through line 380 to one side of light 382. The other side of light 382 is connected to the positive side of battery 376. Momentary contact switch 378 is positioned directly over the top of the small end of conical portion 322 of holding shank 320.

Guide block 384 is affixed to the lower outside portion of cylinder wall 300 by weld 386 or other convenient fastening means. Restraining bolt 388 has a lower end 390 that screwably engages a threaded receptacle 392 and the radial outer portion of pad 348. Restraining bolt 388 extends upward through channel 394 in guide block 384, extends through channel 396 in resilient rubber shock absorber 398, and terminates in a flat head portion 400. Several of these restraint bolt, shock absorber, restraining block structures may be utilized to hold the weight of the pressure plate around the lower perimeter of cylinder 12. The preferred embodiment of the present invention described above shows partial or complete evacuation of cylinder 12 as being accomplished through fittings 350 and 352 in pressure plate assembly 344. A specifically included alternative to this structure would be to have separate ports for vacuum and pressure. The pressure port would still be located in the lower end of cylinder 12 so pressurizing cylinder 12 would result in piston 308 moving upward and its restraining shank 320 engaging restraining mechanism 326. The vacuum coupling to cylinder 12, however, may be mounted anywhere so long as it provides fluid communication with the interior of cylinder 12 below piston 308 when piston 308 is held by restraining mechanism 326. Further, it is not intended that the present invention be limited to a cylinder that is moved entirely by pressure. A hydraulic cylinder could easily be adapted to perform the equivalent function, i.e. raising piston 308 after the device has been operated. The materials utilized in construction of the preferred embodiment of the present invention present no difficulties. Construction of the apparatus is well within the skill of those knowledgeable in the art of seismic generator construction.

Operationally, the apparatus shown in FIG. 3 is taken into position by a relatively light truck or other vehicle as is shown in FIG. 1, above. Hydraulic rams or other means are then employed to bias pressure plate assembly 16 into firm contact with the ground as is shown in FIG. 2, above.

Once pressure plate 16 is biased in contact with the ground, pressure source 362 is energized and valve 364 is opened forcing higher than atmospheric pressure into cylinder 12. This higher than atmospheric pressure forces piston 308 upward until conical portion 322 of restraining shank 320 passes through restraining plate 324. When the tip of cone section 322 presses button 378, it closes a switch which lights light 382 signifying that the weight is at the top of the chamber. Valve 364 is then closed and valve 358 opened to vent the interior 13 of cylinder 12 to atmospheric pressure. Valve 358 is then closed.

Figure 4:
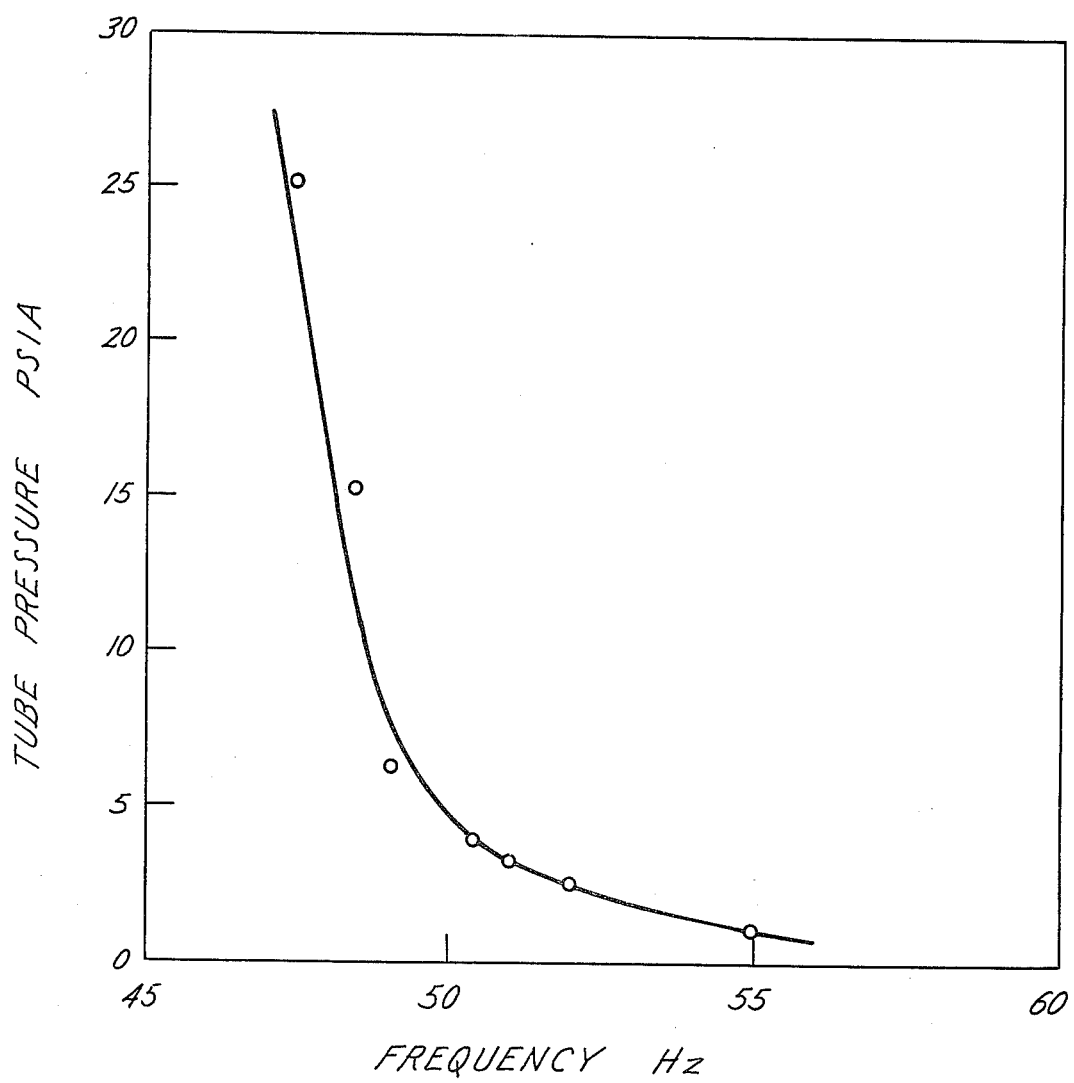
FIG. 4 is a graph plotting the frequency of the seismic wave generated by a 7-inch test unit constructed according to the preferred embodiment of the present invention against the ambient pressure remaining in the cylinder of the apparatus when it is actuated.

Then the operator of the apparatus determines what frequency seismic wave is to be generated. He would then determine, by looking at a table such as the one shown in FIG. 4, what pressure must be present inside cylinder 12 to produce the desired frequency. The operator would then actuate vacuum pump 366 and open valve 368. Once interior 13 of cylinder 12 was evacuated to the desired pressure, the operator would close valve 368. The operator would then close switch 374 which actuates release solenoids 338 and 340. Once released, piston 308 is propelled toward the top of base plate assembly 344 by the force of gravity and by the pressure of the atmosphere entering through openings 304 in top plate 302. The piston compresses the gas remaining in the cylinder and then strikes base plate 308, which injects a seismic wave into the ground.

The procedure described above is then repeated as necessary and at varying pressure to provide different frequency seismic waves.

Because the present invention does not require use of a fluid coupling medium, such as oil, between the free piston 308 and pressure pad 346, it may be operated at any angle. This can be very important in mine shafts and like places where the collection of horizontal seismic data is required.

ANALYTIC DISCUSSION AND TEST RESULTS

It is important to note the role played by the residual air remaining in the cylinder of the present invention. If the cylinder is totally evacuated, lack of this air would allow the piston to strike the top of the base plate assembly directly. Such a sharp impact would transfer momentum from the piston to the base plate assembly very quickly. This quick transfer of momentum would cause the present invention to produce a relatively sharp spike of seismic energy at a high fundamental frequency. It would also produce high frequency transients that would manifest themselves as noise and ringing in the seismic signal. Virtually all prior art devices actuated by falling masses suffer from these defects which are caused by this extremely rapid transfer of momentum from the falling object to the portion of the device in contact with the ground.

The residual air remaining in the cylinder of the present invention when it is actuated is compressed by the falling piston. As it compresses, the trapped air evenly transfers momentum from the falling piston to the base plate. This momentum transfer overcomes the inertial and frictional load of the base plate and causes it to begin moving before it is actually struck by the piston. This transfer of momentum has the effect of stretching out the energy pulse applied by the present invention to the ground. This even transfer of mementum from the piston to the base plate results in the present invention achieving a much better impedance match between its motion and the physical characteristics of the ground that gives rise to the seismic waveform that is of geophysical interest. The practical result is that the present invention transfers a higher proportion of its energy into the ground as useable seismic waves and greatly reduces useless noise and ringing.

Figure 5:
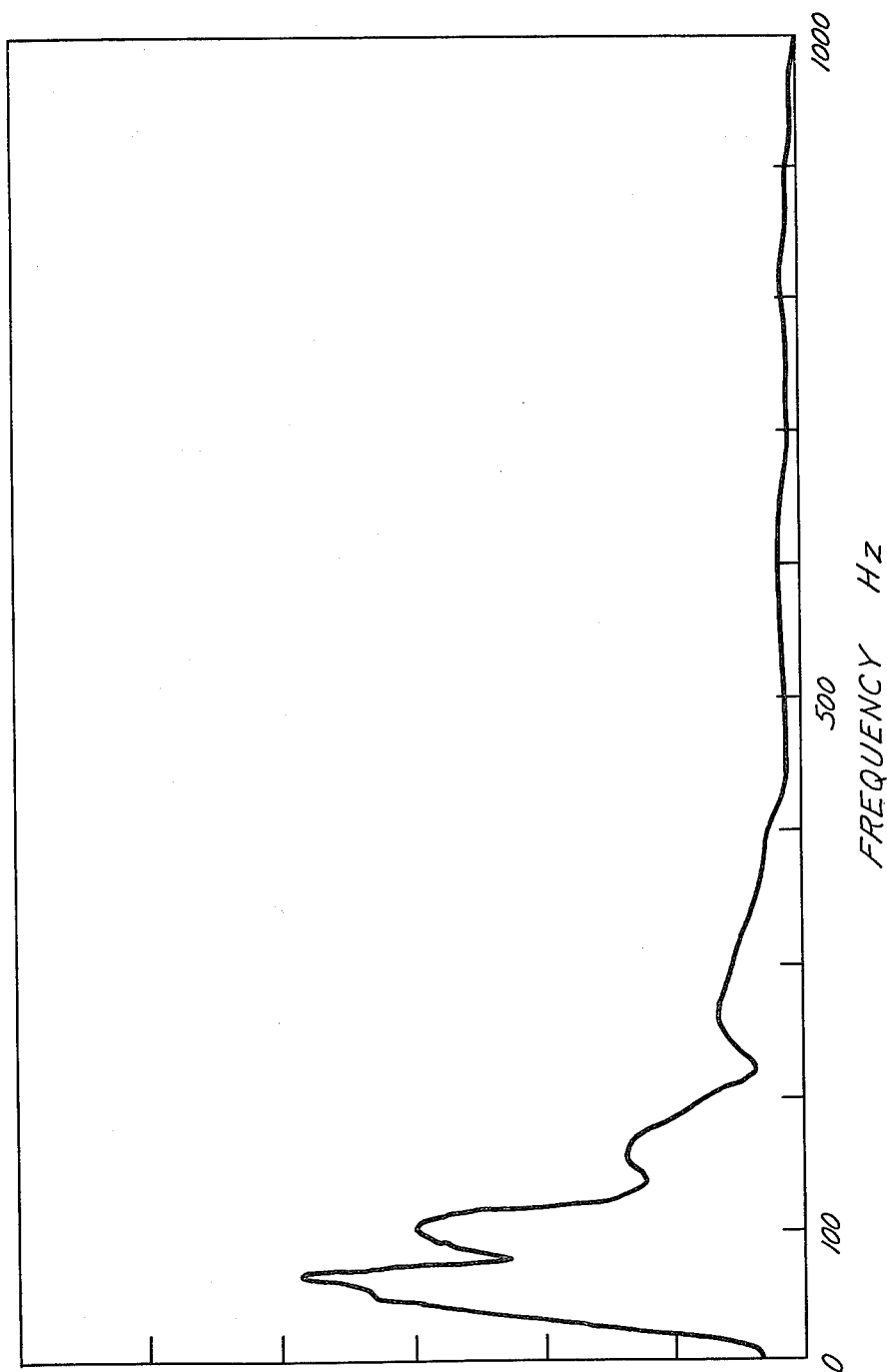
FIG. 5 is a plot of seismic wave amplitude versus frequency for a specific run of the test unit.

FIG. 5 shows a typical spectrum plot generated by a 7-inch in diameter experimental test unit constructed according to the preferred embodiment of the present invention. Data from tests of this unit was also used to generate the curve given in FIG. 4. The spectrum plot shown in FIG. 5, which contains its major peak at 52.5, cps, illustrates the relatively high Q (the "quality factor", a measure of the ability of the device to select the frequency of seismic impulse transmitted to the ground) and lack of undesirable noise associated with the preferred embodiment of the present invention.

The present invention employs a pressure differential (via an evacuated chamber) as well as gravity for acceleration of the mass used to inject energy into the ground. As such, performance can be described by classical mechanical relations:

$F = ma$     ($m$ = piston mass)
($a$ = acceleration)
$v = \int 2da$     ($d$ = travel distance)
$a = g(1 + pA/m)$     ($p$ = pressure)
($A$ = piston area)

Momentum = $mv$ = $m/2\ dg(1+pA/m)$
Impulse applied = $m\ v = mv$
Kinetic energy applied to ground K.E. of piston = $\frac{1}{2}mv^2 = dg(m+pA)$ These relations assume the absence of residual air in the cylinder to cause any piston deceleration, and that negligible energy is lost via inelastic processes in the piston and base plate.

The force applied to the ground is then:

$$F = \frac{\text{impulse}}{t} = \frac{mv}{t} = \frac{m/2dg(1 + pA/m)}{t}$$

where t is the time required to bring the piston to rest.

The impulse time, t, can also be estimated by observing that the characteristic seismic frequencies generated are 25–100 Hz, and the half cycles associated with ground acceleration are thereby 0.005–0.020 seconds in duration. So, choosing t = 0.01 seconds as representative, based on these observations, the force applied to the base plate is:

$$F = \frac{m/2dg(1 + pA/m)}{0.01}$$

and, similarly, the kinetic energy available for generation of seismic waves is:

$$F = \tfrac{1}{2}mv^2 = dg(m + pA)$$

The acoustic signal generated by the piston should be related to the piston mass, surface area and travel distance. For the two systems studied, Table I contains results obtained from these relations.

TABLE I

|  | 7-inch diameter unit | 14-inch diameter unit |
|---|---|---|
| A | 38.48 in$^2$ = 0.0248 m$^2$ | 156.14 in$^2$ = 0.0992 m$^2$ |
| m | 50.4 kg | 317.8 kg |
| d | 7 ft. = 2.134 m | 8 ft. = 2.438 m |
| F = mg + pA | 2.98 × 10$^3$ newtons | 1.31 × 10$^4$ newtons |
| a = F/m | 59.2 m/s$^2$ | 41.2 m/s$^2$ |
| v = √2da | 15.9 m/s | 14/2 m/s |
| mv | 8.01 × 10$^2$ kg m/s | 4.50 × 10$^3$ kg m/s |
| t = | 0.01 s | 0.01 s |
| Impulse = mv/t | 8.01 × 10$^4$ newtons | 4.5 × 10$^5$ newtons |
| KE = ½ mv$^2$ | 6.37 × 10$^3$ joules | 3.19 × 10$^4$ joules |

Piston 308 first strikes a base plate 344 which is firmly in contact with the ground. The base plate for the 7-inch diameter unit is 20 inches in diameter (A=0.203 m$^2$) while the 14-inch diameter unit base plate is 40 inches in diameter (A=0.810 m$^2$). Hence, the pressure applied to the two cases is:

$$P = \frac{\text{Impulse}}{\text{Area}} = 3.95 \times 10^5 \text{ newtons}$$

for the 7-inch unit; and P=5.55×10$^5$ newtons for the 14-inch unit, assuming no inelastic or friction losses. So, we see that the "theoretical" ratio of pressures applied by a 7-inch and a 14-inch experimental unit is 5.55/3.95=1.40/1, whereas the ratios of kinetic energies in their respective pistons is 31.9/6.37=5.0/1. This suggests that in the "near field" of the source, where the pressure pulse would be expected to be more important than energy in determining the strength of surface waves, we should observe a 1.5/1 ratio in signal strength from the two sources. In the "far field", there should be more nearly a 5/1 ratio, as determined by their energy available.

No attempt was made to measure the "far field", since that requires an extensive experimental layout, but measurements were made in the "near field" at a distance of 5-feet from each source. At 40 Hz they show a ratio of peak signals from the two sources of 1.6/1(4.2 db), in good agreement with the above analysis.

HORIZONTAL MODE

The following paragraphs describe an apparatus and method for using the present invention to generate horizontal, as well as vertical, seismic wave forces. In what follows, the horizontal vector of said force is referred to as the "shear" component.

Figure 6:
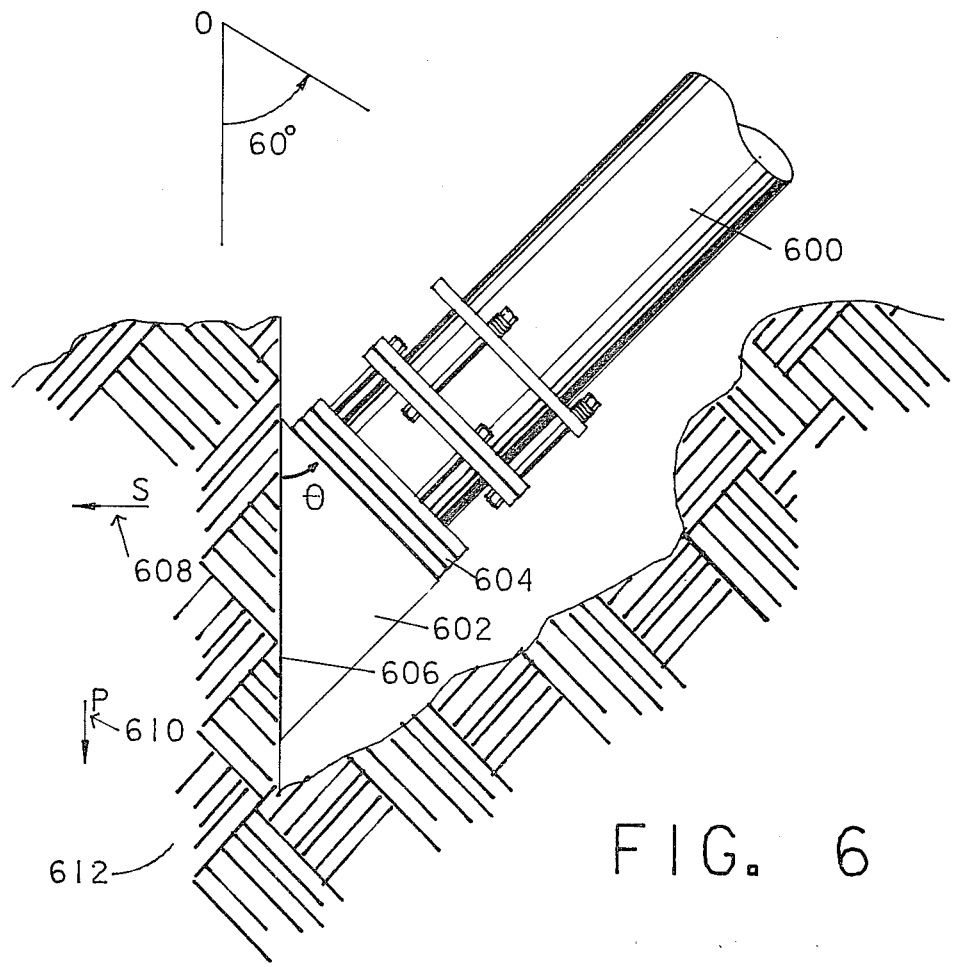
FIG. 6 is a side elevational view of the thumper apparatus attached to the horizontal (shear) wave generating attachment.

FIG. 6 is a view of the thumper cylinder 600 attached to shear wave head 602 along base plate 604. Structurally, shear wave head 602 may be attached to thumper base plate 604 by either permanent means (welding, bond) or by removable bolts incorporating shock mount rings, fixed and floating rings as described in FIG. 10. The means of attachment are well described in connection with FIGS. 9 and 10, below, and therefore will not be described here in detail.

Functionally, shear wave head 602 allows the thumper to produce horizontal and vertical seismic shear wave forces as shown by vectors 608 and 610, respectively. When the thumper is actuated, head 602 must be firmly pressed flush with the side 606 of excavation 612. The shear wave forces of the head 602 in the directions shown by vectors 608 and 610 are determined by the cosine and sine respectively, of angle theta. If theta is 0 degrees, i.e. the base plate is a flat plate held flat against side 606, vector 610 is zero, and all force is in the direction indicated by vector 608. As theta increases, the force in in the (vertical) direction indicated by the vector 610 increases in proportion to the sine of angle theta, and the force in the (horizontal) direction indicated by vector 608 decreases in proportion to the cosine of the angle theta. On the other hand, if theta is 90 degrees, i.e. the base plate is a flat plate held flat against the ground in a vertical position, horizontal vector 608 is zero and all force is in the (vertical) direction indicated by vector 610. As theta decreases, the force in the direction indicated by vector 608 increases in proportion to the cosine of angle theta, and the force in the direction indicated by the vector 610 decreases in proportion to the cosine of angle theta.

The angle chosen for theta will be a trade-off between a small angle for maximum shear wave production and a large angle for the smallest amount of excavation. In practice an angle of 45 degrees has worked well. Shear wave head 602 attached to thumper 600 is shown in FIG. 6 positioned at a 45 degree angle to soil excavation 612. The apparatus is not limited to this angle, but may be positioned at any horizontal or vertical reference between a 0 degree to 90 degree range.

Shear wave head 602 may be composed of a variety of materials, aluminium being preferred because of its low weight and resiliency. The shear wave head may be completely solid or can be hollowed to varying degrees.

Shear wave head configuration is not limited to the right triangular shape depicted, but may be any shape capable of producing a component in the direction indicated by vector 608.

Figure 7:
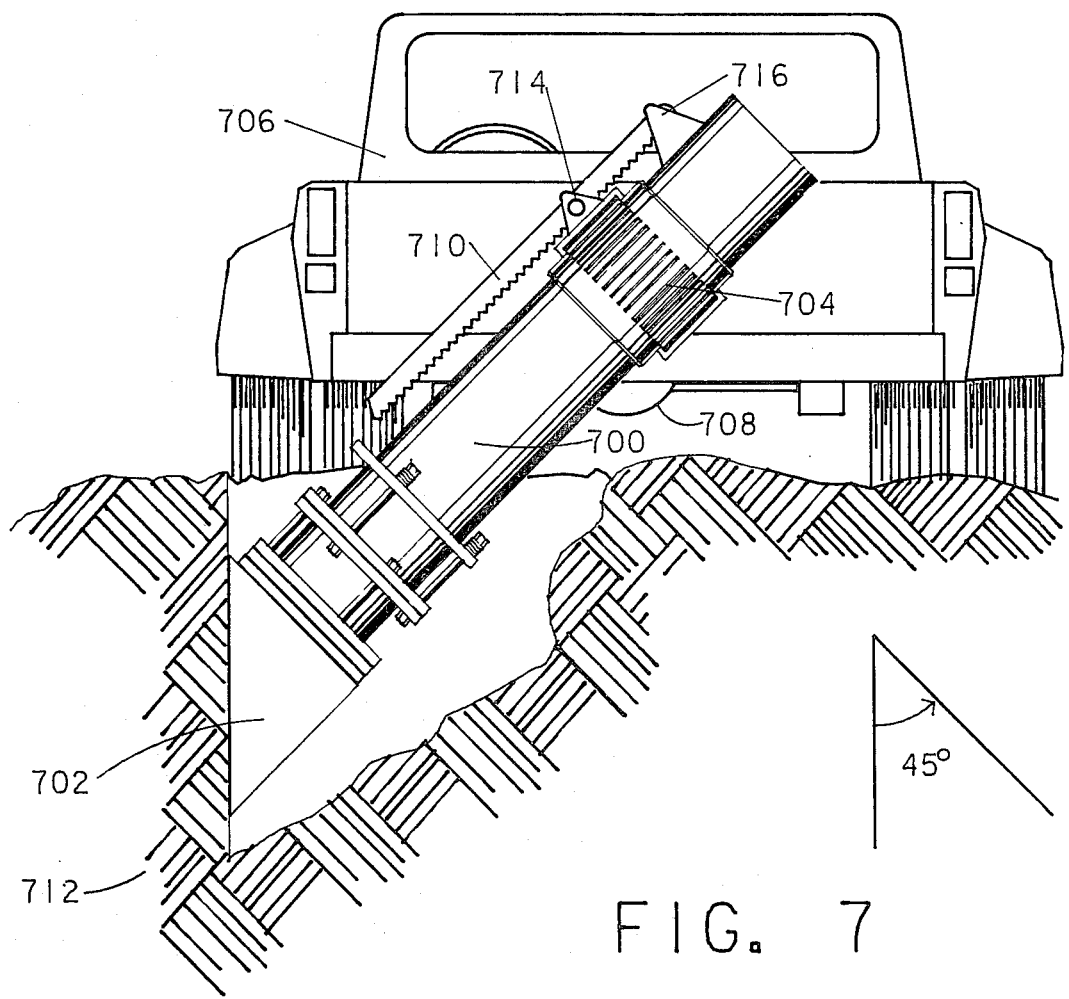
FIG. 7 is a view of the vehicle-mounted thumper apparatus extended into its operational position at a 45 degree angle to the right of vertical.

FIG. 7 shows vacuum thumper device with shear wave head held within restraining collar and positioning mechanism attached to a vehicle and extended into its operational position.

Shear wave head 702 is connected to vacuum thumper cylinder 700 and pressed firmly in operational position flush with excavation 712 at a 45 degree angle.

Vacuum thumper cylinder 700 is circularly connected through restraining collar and positioning mechanism 704, which is attached to vehicle 706. Collar connection 708 connects and holds the cylinder 700 to the undersection of vehicle 706. The supporting restraining collar and positioning mechanism 704 may be made of any material adequate to bear the load placed on it when the cylinder is extended into its operational position plus the vibrational impulse loads associated with actuation of the seismic source taught by the present invention. Rack 710 holds the restraining collar and positioning mechanism 704 in place by pinion 714 and anchor bracket 716. These constructions are well known to those skilled in the art and need not be described in detail. The description of the preferred embodiment of the present invention is not limited to the specific structural details discussed above. Many different ways of bringing the apparatus taught by the present invention into contact with the earth would be obvious to those skilled in the art.

Support restraining and positioning collar 704, rack 710 and pinion 714 may be powered pneumatically, hydraulically, or electrically. All the means of power and control are well known to those skilled in the art and therefore will not be described in detail.

Support restraining and positioning collar 704 serves to position thumper 700 and shear wave head 702 both by raising and lowering thumper cylinder 700 along its length and by rotating cylinder 700 360 degrees about its axis. Collar 704 may also be swung left-right at its connection to vehicle 706.

The low weight of the thumper with shear wave attachment makes such apparatus adaptable to vehicles of relatively light weight. This is an improvement over inventions of the prior art, which required heavy vehicles due to the large gross weight of the seismic apparatus and the resulting need for heavy weight to position the apparatus and prevent recoil. Since the present embodiment of the thumper-shear wave apparatus is relatively lightweight, it can be mounted on a wide range of smaller vehicles, thus facilitating a wider range of applications and a broader range of operating environments.

The restaining collar and positioning mechanism 704 allows positioning of the thumper/shear wave apparatus about three axes (vertical, horizontal circular, left-right swing). This freedom of movement creates greater flexibility for positioning and use of the shear wave head. Such flexibility, along with the lighter weight of the total apparatus aforementioned, results in a wider range of applications and ease of operation not available in inventions reflected by the prior art.

Figure 8A:
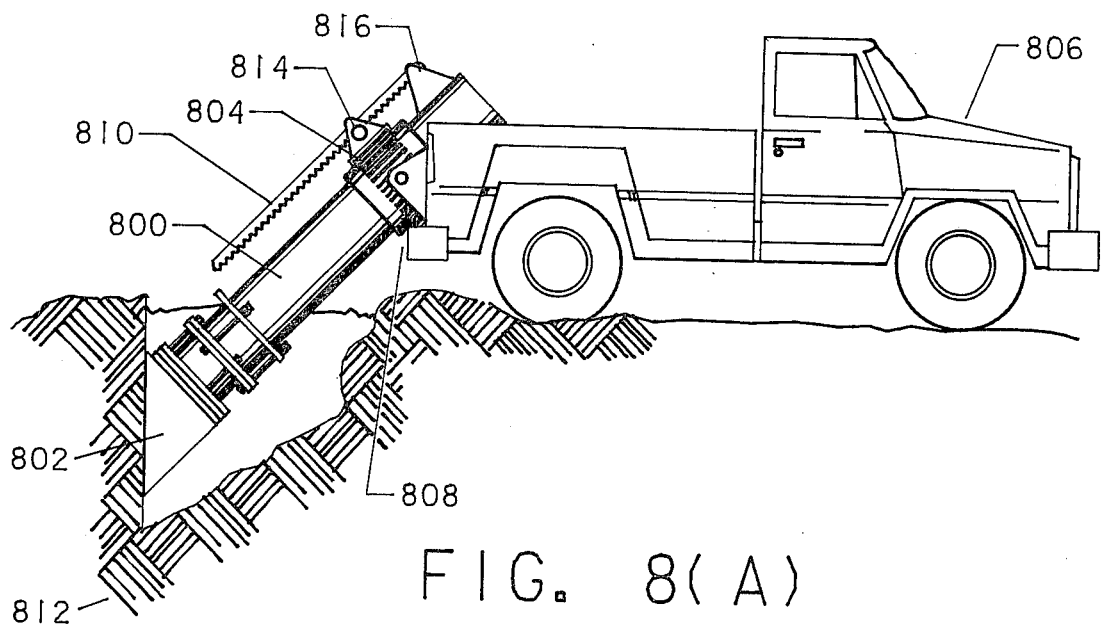
FIG. 8(a) is a view of the vehicle-mounted thumper apparatus extended to operational position flush with excavation.
Figure 8B:
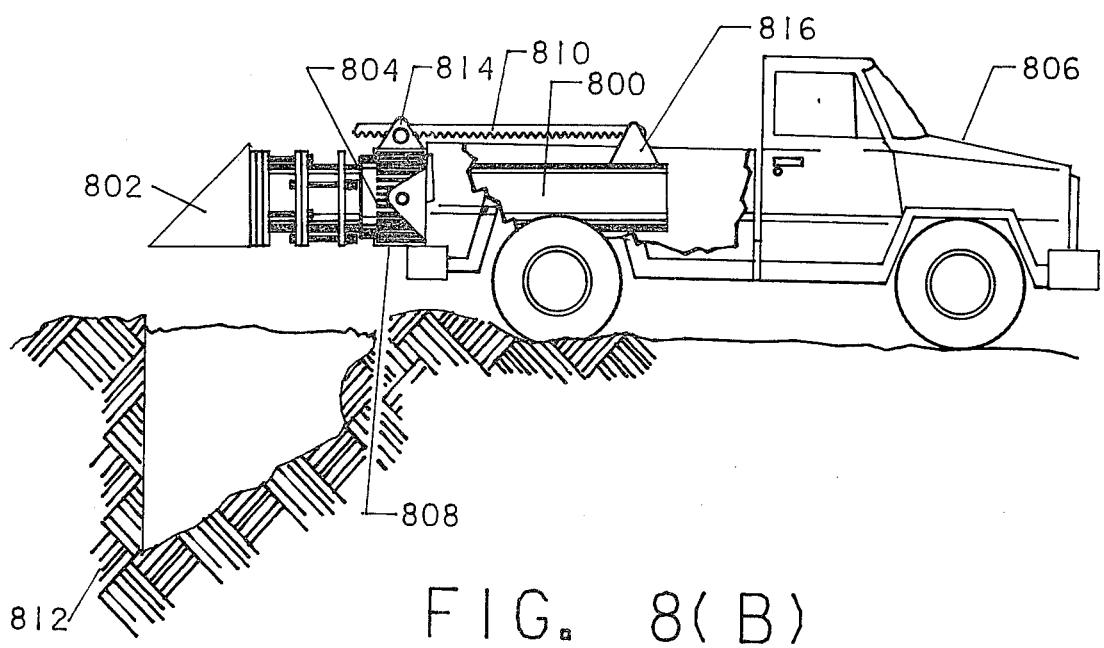
FIG. 8(b) is a view of the vehicle-mounted thumper apparatus in its contracted, movable position.

FIG. 8(*a*) shows shear wave head 802 connected to thumper cylinder 800 with rack 810 and pinion 814 positioned so that cylinder 800 is extended to operational position flush with excavation 812.

Thumper cylinder 800 is annularly connected through restraining positioning collar 804 which in turn is connected to vehicle 806 at collar connection 808. Connection 808 and rack 810, pinion 814 and anchor bracket 816 hold collar 804 and cylinder 800 in place.

FIG. 8(*b*) shows shear wave head 802 and thumper cylinder apparatus 800 with rack 810 and pinion 814 positioned so that cylinder 800 is in its contracted, mobile position. This position is achieved by raising thumper cylinder 800 through its length through restraining positioning collar 804. Connection 808 and rack 810, pinion 814 and anchor bracket 816 hold collar 804 and cylinder 800 in place.

DESCRIPTION

The restraining collar and positioning mechanism and the rack 810, pinion 814 and anchor 816 may be composed of a variety of materials, and construction is obvious to those skilled in the art. Lightweight materials are preferred, to keep total weight of the apparatus to a minimum. Collar 804, rack 810 and pinion 814 may be powered by hydraulic, pneumatic, or other power means applicable.

Collar connector 808 may be composed of a variety of preferred materials. Connector 808, as well as rack 810 and pinion 814, should be powered by preferred means to allow front-back tilt and left-right swing. Connector 808 also incorporates a suitable locking mechanism to provide stability while the thumper-shear wave apparatus is in operation. The means of power, movement and locking of connector 808 and rack 810 and pinion 814 are obvious to those skilled in the art and need not be detailed here.

The embodiment as shown in FIGS. 8(*a*) and 8(*b*) illustrates the versatility and ease of operation of the present invention. The invention may easily be operated in smaller size excavations, facilitating horizontal and vertical shear wave generation at any desired angle.

Figure 9:
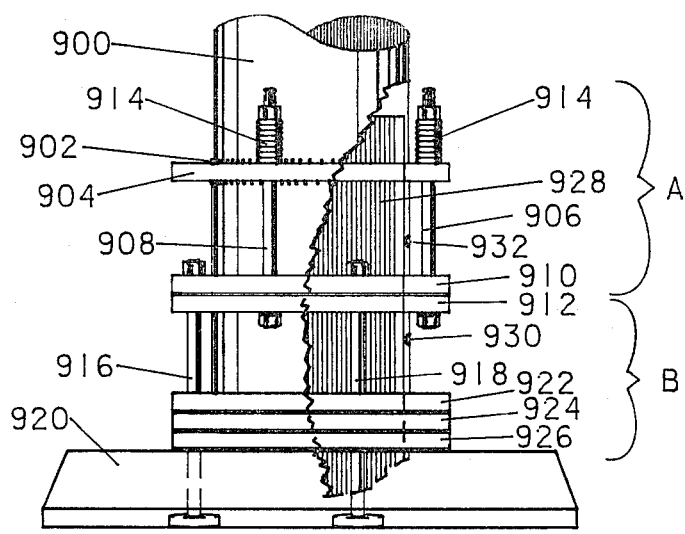
FIG. 9 is a view of the base plate assembly for attachment of the thumper cylinder to the base plate.

FIG. 9 shows the base plate assembly for attachment of thumper cylinder to base plate.

Thumper cylinder tube 900 is permanently attached by weld 902 or other means to fixed ring 904.

Bolts 906 and 908 secure tube 900 to floating ring 910 and upper shock mount ring 912. Bolts 906 and 908 run vertically through floating ring 910 and upper shock mount ring 912 up through fixed ring 904. Washers 914 insure secure attachment and tension dispersal.

Bolts 916 and 918 secure base plate 920 to upper shock mount ring 912 and floating ring 910. These bolts also run through lower shock mount rings 922, 924, and 926.

Base plate 920 incorporates shock piston 928 which extends up and into thumper cylinder tube 900. Rings 930 and 932 circumvent shock piston 928, providing a vacuum seal between piston 928 and the inside of cylinder 900.

Thumper cylinder 900, shock rings 904, 912, 922, 924, and 926, and base plate 920 and shock piston 928 may be composed of a variety of materials, aluminum preferred because of its light weight. Floating ring 910 is formed from neoprene, for its damping properties and long life.

Activation of the thumper device creates a shock wave and recoil when a controlled amount of air pressure is compressed between the thumper piston and shock piston 928 after release of thumper piston. Upon activation, there is compression movement in areas A and B shown. Shock plates 922, 924, 926 provide a resilient base along with base plate 920 to offset the downward shock compression caused by compacting of pressure between piston and shock piston 928. The bolt and shock plate configuration allow movement through areas A and B between thumper cylinder 900 and base plate 920.

The configuration shown in FIG. 9 allows the required recoil movement to preserve the apparatus while allowing production of a clear pressure signal. Such configuration is also a single, reliable means of coupling the thumper apparatus to the base plate.

Figure 10:
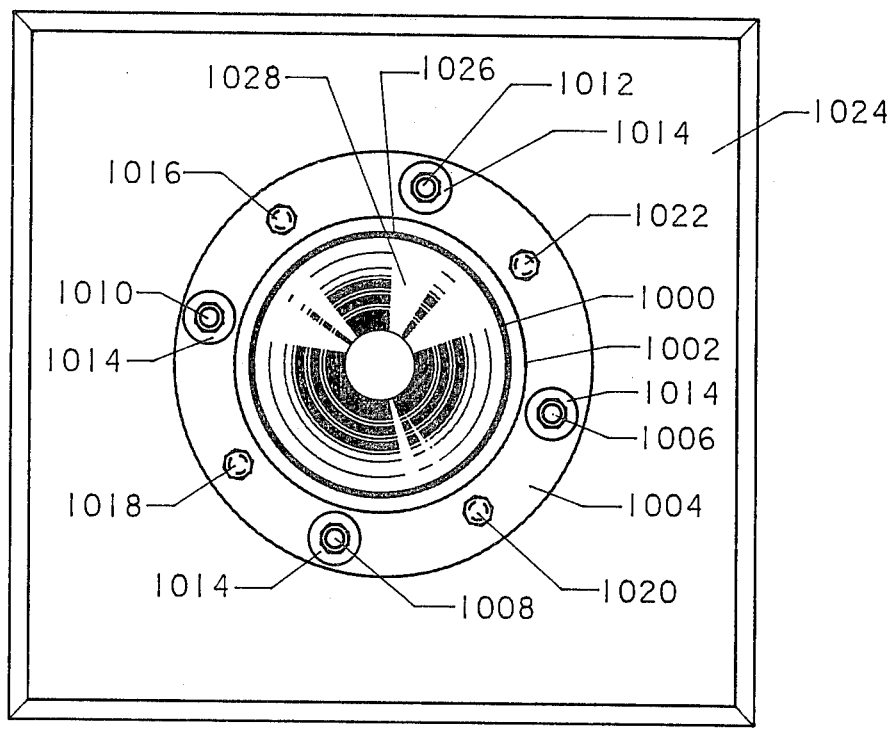
FIG. 10 is a top view of cylinder-base plate assembly shown in FIG. 9.

FIG. 10 is a top view of cylinder-base plate assembly shown in FIG. 9.

Thumper cylinder 1000 is attached by weld 1002 or other permanent means to fixed ring 1004. Upper bolts 1006, 1008, 1010, 1012 securing cylinder and fixed ring to floating ring (not shown) and upper shock ring (not shown) are shown in position around fixed ring 1004. Washers 1014 below bolt attachments 1006, 1008, 1010, 1012 are also shown.

Lower bolt attachments 1016, 1018, 1020, 1022 which secure upper shock ring (not shown) and floating ring (not shown) to base plate 1024 are shown in lighter shading to illustrate their respective positioning.

This configuration of upper 1006, 1008, 101, 1012 and lower 1016, 1018, 1020, 1022 securing bolts in alternating array insures even load and tension dispersal.

Ring 1026 provides an airtight seal between base plate piston 1028 and thumper cylinder 1000.

Figure 11:
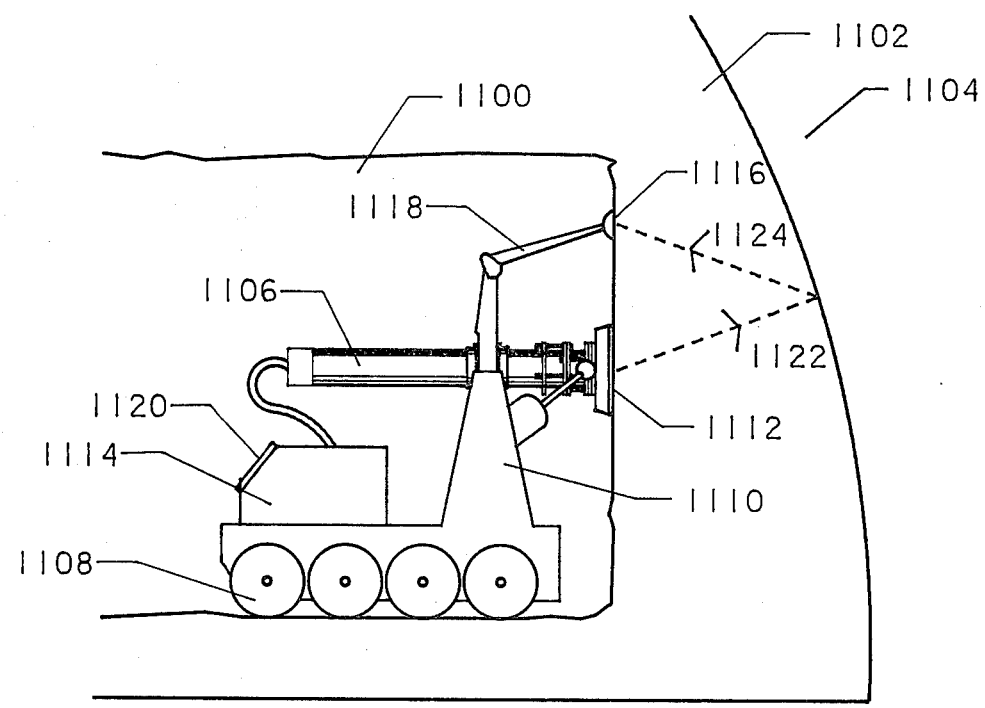
FIG. 11 shows the vacuum thumper used for seismic evaluation of a salt dome formation.

FIG. 11 shows an embodiment of the described vacuum thumper used for seismic evaluation of a salt dome formation.

This embodiment of the invention is shown in an excavation 1100 in salt dome 1102 inside rock formation 1104.

Vacuum thumper cylinder 1106 is mounted on a small wheeled vehicle 1108. A small support arm 1110 steadies the cylinder and base plate apparatus. By moving vehicle 1108 to wall of salt dome 1102, base plate 1112 is pressed firmly in place for operation.

Vacuum thumper 1106 is actuated by vacuum pump 1114 mounted on vehicle 1108. Geophone 1116 supported by positioning arm 1118 is extended away from thumper apparatus to receive the activated reflected seismic signal. Such signals are received and displayed at electronics board 1120.

The apparatus shown has been more fully described in FIGS. 1-10 describing the thumper apparatus.

By activation of thumper 1106, a seismic signal 1122 can be created and transmitted through base plate 1112 into the strata. By analysis of the reflected signal 1124 received by geophone 1116, the distance between excavation 1100 and rock structure 1104 can be ascertained.

Density and shape of the salt dome formation through analysis of reflected signal 1224 can also be ascertained.

Figure 12:
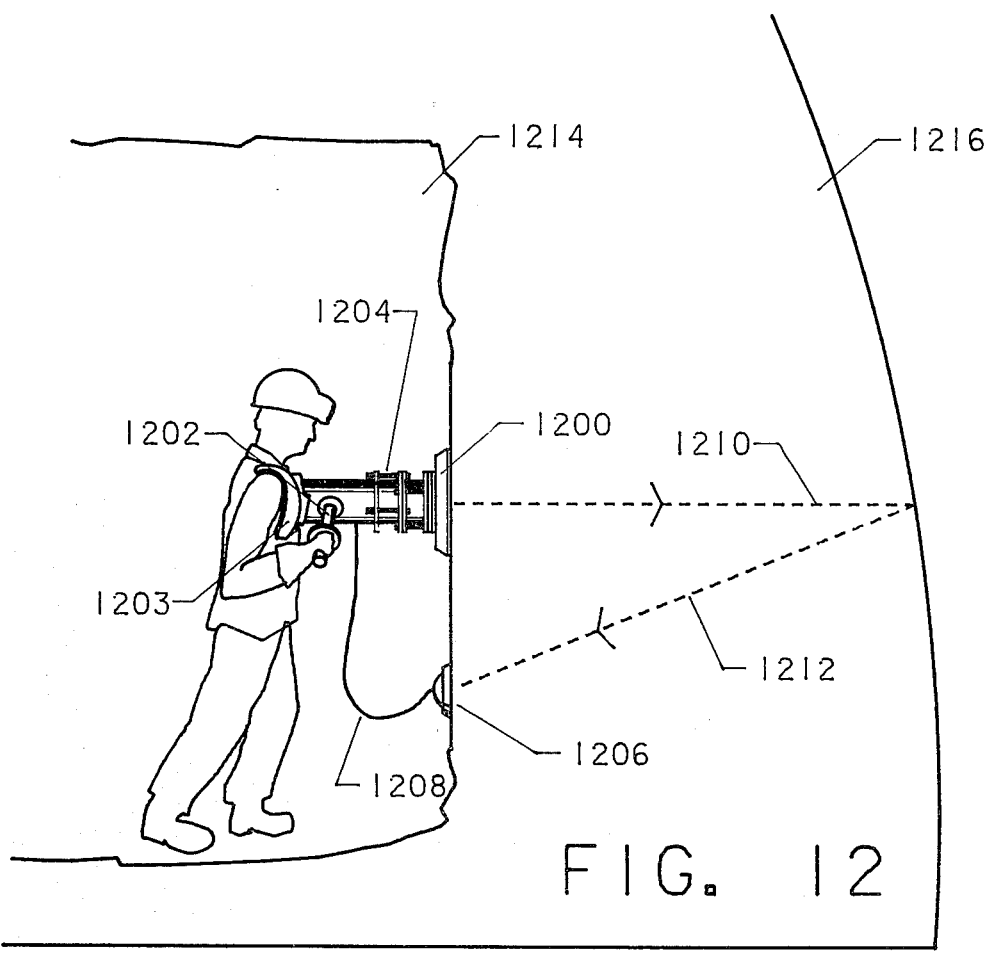
FIG. 12 shows a hand-held version of the vacuum thumper apparatus.

FIG. 12 shows a hand-held version of the vacuum thumper apparatus.

Base plate 1200 is held firmly in place by hand through use of hand grips 1202 and shoulder support 1203. Vacuum thumper cylinder 1204 is smaller than in the previous embodiments, but this is facilitated by the light weight of the vacuum and piston apparatus.

Geophone 1206 is connected by transmitting wire 1208 to the apparatus.

By activation of thumper 1204, a seismic signal 1210 can be created and transmitted into the strata. By analysis of the reflected signal 1212 received by geophone 1206, the distance between excavation 1214 and rock structure 1216 can be ascertained.

The above preferred embodiments are not meant to be limiting. Many obvious changes could be made by one skilled in the art of seismic generator construction. The present invention should only be limited by the appended claims and their legal equivalents.

I claim:

1. A thumper-type frequency tunable seismic energy source comprising:
    a uniform bore tube open at its top and bottom ends;
    a slidingly movable free piston disposed within said tube, said piston movable through the interaction of air pressure and gravity, said piston including piston sealing means for maintaining an annular hermetic sealing contact between the perimeter of said piston and the bore of said tube;
    restraining means for releasably holding said free piston proximate the top end of said tube;
    a base plate plug slidably disposed at, and extending beyond and outside the bottom end of said tube, said plug including sealing means for maintaining an annular hermetic sealing contact between the perimeter of said plug and the bore of said tube;
    frequency adjusting means for varying the rate of kinetic energy transfer between said free piston and said base plate plug with respect to the generation of separate seismic pulses, said frequency adjusting means comprising vacuum application means for selectively creating a pressure lower than atmospheric pressure in said uniform bore tube between said free piston and said base plate plug;
    compression control means for preventing the escape of air from said uniform bore tube when said piston falls toward said base plate;
    contact pressure application means for biasing the bottom end of said uniform bore tube against the ground in a direction along the longitudinal axis of said tube; and
    tube rotation means for adjustably rotatably varying the angle of inclination of the longitudinal axis of said uniform bore tube with respect to the ground.

2. The device of claim 1 wherein said tube rotation means comprise a rack and pinion gear around the outside perimeter of said uniform bore tube.

3. A thumper-type frequency tunable seismic energy source comprising:
    a uniform bore tube open at its top and bottom ends;
    a slidingly movable free piston disposed within said tube, said piston movable through the interaction of air pressure and gravity, said piston including piston sealing means for maintaining an annular hermetic sealing contact between the perimeter of said piston and the bore of said tube;
    restraining means for releasably holding said free piston proximate the top end of said tube;
    a base plate plug slidably disposed at, and extending beyond and outside the bottom end of said tube, said plug including sealing means for maintaining an annular hermetic sealing contact between the perimeter of said plug and the bore of said tube;
    frequency adjusting means for varying the rate of kinetic energy transfer between said free piston and said base plate plug with respect to the generation of separate seismic pulses, said frequency adjusting means comprising vacuum application means for selectively creating a pressure lower than atmospheric pressure in said uniform bore tube between said free piston and said base plate plug;
    compression control means for preventing the escape of air from said uniform bore tube when said piston falls toward said base plate;
    contact pressure application means for biasing the bottom end of said uniform bore tube against the ground in a direction along the longitudinal axis of said tube; and
    handle means affixed to said uniform bore tube for manually biasing said bottom end of said uniform bore tube against the ground.

4. A thumper-type frequency tunable seismic energy source for generating horizontal as well as vertical seismic waves, comprising:
    a uniform bore tube open at its top and bottom ends;
    a slidingly movable free piston disposed within said tube, said piston movable through the interaction of air pressure and gravity, said piston including piston sealing means for maintaining an annular hermetic sealing contact between the perimeter of said piston and the bore of said tube;
    restraining means for controllably holding said free piston proximate the top end of said tube;
    a base plug slidingly movably disposed at the bottom end of said tube, said plug including plug sealing means for maintaining an annular hermetic sealing contact between the perimeter of said plug and the bore of said tube;

a base plate affixed to the bottom end of said plug, said base plate extending beneath said open bottom end of said tube, and having a perimeter that extends beyond the outer diameter of said tube;
connecting means for elastically coupling the portion of said base plate that extends beyond the outer diameter of said tube to the outer wall of said tube;
frequency adjusting means for varying the rate of kinetic energy transfer as between individual seismic pulses, said rate of kinetic energy transfer being between said free piston and said baseplate, said frequency adjusting means comprising vacuum application means for selectively creating a pressure lower than atmospheric in said uniform bore tube between said free piston and said base plate; said frequency adjusting means further comprising a valve having a valve block defining four planar passageways each offset 90 degrees from the other, and further defining a central cylindricl opening in fluid communication with all 4 passageways, a cylindrical valve core sized so as to closely engage the inner surface of said cylindrical opening, said valve core having two passageways in planar coincidence with said 4 openings, each of said channels having two ends offset 90 degrees from each other, whereby a 90 degree rotation of said valve core will place two of said passageways in said valve block in fluid communication with each other, and sealing means for hermetically isolating each opening of each passageway in said valve core when the ends of said 90 degrees offset passageways are in fluid communication with said openings; and
compression control means for preventing the escape of the remaining air from said uniform bore tube when said piston falls toward said base plate.

5. A thumper-type frequency tunable seismic energy source for generating horizontal as well as vertical seismic waves, comprising:
a uniform bore tube open at its top and bottom ends;
a slidingly movable free piston disposed within said tube, said piston movable through the interaction of air pressure and gravity, said piston including piston sealing means for maintaining an annular hermetic sealing contact between the perimeter of said piston and the bore of said tube;
restraining means for controllably holding said free piston proximate the top end of said tube;
a base plug slidingly movably disposed at the bottom end of said tube, said plug including plug sealing means for maintaining an annular hermetic sealing contact between the perimeter of said plug and the bore of said tube;
a base plate affixed to the bottom end of said plug, said base plate extending beneath said open bottom end of said tube, and having a perimeter that extends beyond the outer diameter of said tube;
connecting means for elastically coupling the portion of said base plate that extends beyond the outer diameter of said tube to the outer wall of said tube;
frequency adjusting means for varying the rate of kinetic energy transfer as between individual seismic pulses, said rate of kinetic energy transfer being between said free piston and said baseplate, said frequency adjusting means comprising vacuum application means for selectively creating a pressure lower than atmospheric in said uniform bore tube between said free piston and said base plate;
compression control means for preventing the escape of the remaining air from said uniform bore tube when said piston falls toward said base plate;
contact pressure application means for biasing the bottom end of said uniform bore tube against the ground in a direction along the longitudinal axis of said tube; and
tube rotation means for adjustably rotatably varying the angle of inclination of the longitudinal axis of said uniform bore tube with respect to the ground.

6. The device of claim 5 wherein said tube rotation means comprise a rack and pinion gear around the outside perimeter of said uniform bore tube.

7. A thumper-type frequency tunable seismic energy source for generating horizontal as well as vertical seismic waves, comprising:
a uniform bore tube open at its top and bottom ends;
a slidingly movable free piston disposed within said tube, said piston movable through the interaction of air pressure and gravity, said piston including piston sealing means for maintaining an annular hermetic sealing contact between the perimeter of said piston and the bore of said tube;
restraining means for controllably holding said free piston proximate the top end of said tube;
a base plug slidingly movably disposed at the bottom end of said tube, said plug including plug sealing means for maintaining an annular hermetic sealing contact between the perimeter of said plug and the bore of said tube;
a base plate affixed to the bottom end of said plug, said base plate extending beneath said open bottom end of said tube, and having a perimeter that extends beyond the outer diameter of said tube;
connecting means for elastically coupling the portion of said base plate that extends beyond the outer diameter of said tube to the outer wall of said tube;
frequency adjusting means for varying the rate of kinetic energy transfer as between individual seismic pulses, said rate of kinetic energy transfer being between said free piston and said baseplate, said frequency adjusting means comprising vacuum application means for selectively creating a pressure lower than atmospheric in said uniform bore tube between said free piston and said base plate; and
compression control means for preventing the escape of the remaining air from said uniform bore tube when said piston falls toward said base plate; and
handle means affixed to said uniform bore tube for manually biasing said bottom end of said uniform bore tube against the ground.

8. A thumper-type frequency tunable seismic energy source comprising:
a uniform bore tube open at its top and bottom ends, said uniform bore tube is between 4-inches and 40-inches in diameter and between 2-feet and 40-feet in length;
a slidingly movable free piston disposed within said tube, said piston movable through the interaction of air pressure and gravity, said piston including piston sealing means for maintaining an annular hermetic sealing contact between the perimeter of said piston and the bore of said tube, said free piston has a density about equal to or greater than 4-ounces per cubic inch, said piston being equipped with at least one O-ring;

restraining means for releasably holding said free piston proximate the top end of said tube;

a base plate plug slidably disposed at, and extending beyond and outside the bottom end of said tube, said plug including sealing means for maintaining an annular hermetic sealing contact between the perimeter of said plug and the bore of said tube, said base plug further comprises a base plate affixed to the bottom end of said plug, said base plate extending beneath said open end of said tube, and having a perimeter that extends beyond the outer diameter of said tube, said metal base plate is made of material equivalent to 6061T6 aluminum;

frequency adjusting means for varying the rate of kinetic energy transfer between said free piston and said base plate plug with respect to the generation of separate seismic pulses, said frequency adjusting means comprising vacuum application means for selectively creating a pressure lower than atmospheric pressure in said uniform bore tube between said free piston and said base plate plug, said vacuum application means for creating a pressure between 0.5 psia and atmospheric pressure within said uniform bore tube; and compression control means for preventing the escape of air from said uniform bore tube when said piston falls toward said base plate.

9. A method of utilizing a mechanical thumper for creating seismic waves, said thumper having a uniform bore open tube with a base plate plug slidingly movably disposed at and extending beyond and outside the bottom end of said tube, said plug including plug sealing means for maintaining an annular hermetic sealing contact between the perimeter of said plug and the bore of said tube, and a slidingly movable free piston disposed within said tube, said piston including piston sealing means for maintaining an annular hermetic sealing contact between the perimeter of said piston and the bore of said tube, said method of creating seismic waves comprising the steps of:

biasing the base plate plug against the ground, said biasing step is carried out manually;

raising said free piston within said uniform bore tube to the top of said tube;

releasably restraining said piston near the top of said tube;

creating a pressure lower than atmospheric pressure in the space between said piston and said base plate plug;

releasing said piston, said piston movable through the interaction of air pressure and gravity; and hermetically sealing off the space between said piston and said base plate plug within said tube such that the air remaining in that space is compressed as said piston is propelled toward said base plate plug.

10. A method of utilizing a mechanical thumper for creating seismic waves, said thumper having a uniform bore open tube with a base plate plug slidingly movably disposed at and extending beyond and outside the bottom end of said tube, said plug including plug sealing means for maintaining an annular hermetic sealing contact between the perimeter of said plug and the bore of said tube, and a slidingly movable free piston disposed within said tube, said piston including piston sealing means for maintaining an annular hermetic sealing contact between the perimeter of said piston and the bore of said tube, said method of creating seismic waves comprising the steps of:

biasing the base plate plug against the ground, said biasing includes the step of hydraulically moving said uniform bore tube in a direction along the longitudinal axis of said tube, said biasing further comprises the step of rotating said uniform bore tube so as to vary the angle of inclination of the longitudinal axis of said tube relative to the ground;

raising said free piston within said uniform bore tube to the top of said tube;

releasably restraining said piston near the top of said tube;

creating a pressure lower than atmospheric pressure in the space between said piston and said base plate plug;

releasing said piston, said piston movable through the interaction of air pressure and gravity; and hermetically sealing off the space between said piston and said base plate plug within said tube such that the air remaining in that space is compressed as said piston is propelled toward said base plate plug.

11. A method of utilizing a mechanical thumper for creating seismic waves, said thumper having a uniform bore open tube with a base plate plug slidingly movably disposed at and extending beyond and outside the bottom end of said tube, said plug including plug sealing means for maintaining an annular hermetic sealing contact between the perimeter of said plug and the bore of said tube, and a slidingly movable free piston disposed within said tube, said piston including piston sealing means for maintaining an annular hermetic sealing contact between the perimeter of said piston and the bore of said tube, said method of creating seismic waves comprising the steps of:

biasing the base plate plug against the ground;

raising said free piston within said uniform bore tube to the top of said tube;

releasably restraining said piston near the top of said tube;

creating a pressure lower than atmospheric pressure in the space between said piston and said base plate plug, said step of creating a pressure lower than atmospheric pressure comprises the step of tunably evacuating said space to a pressure between 0.5 psia and atmospheric pressure;

releasing said piston, said piston movable through the interaction of air pressure and gravity; and hermetically sealing off the space between said piston and said base plate plug within said tube such that the air remaining in that space is compressed as said piston is propelled toward said base plate plug.

* * * * *